(12) United States Patent
Sarkar

(10) Patent No.: US 9,906,329 B2
(45) Date of Patent: Feb. 27, 2018

(54) SYSTEM AND METHOD FOR RECEIVER WINDOW STATUS ACKNOWLEDGEMENT IN DATA COMMUNICATION

(71) Applicant: Dipankar Sarkar, Saratoga, CA (US)

(72) Inventor: Dipankar Sarkar, Saratoga, CA (US)

( * ) Notice: Subject to any disclaimer, the term of this patent is extended or adjusted under 35 U.S.C. 154(b) by 63 days.

(21) Appl. No.: 14/846,745

(22) Filed: Sep. 5, 2015

(65) Prior Publication Data

US 2016/0134404 A1    May 12, 2016

Related U.S. Application Data

(60) Provisional application No. 62/077,193, filed on Nov. 8, 2014.

(51) Int. Cl.
*H04L 1/16* (2006.01)

(52) U.S. Cl.
CPC .................................. *H04L 1/1621* (2013.01)

(58) Field of Classification Search
CPC ... H04L 1/1621; H04L 1/1635; H04L 1/1642; H04L 1/165
See application file for complete search history.

(56) References Cited

U.S. PATENT DOCUMENTS

| | | | | |
|---|---|---|---|---|
| 2003/0026277 A1* | 2/2003 | Pate | ......................... | H04L 47/32 370/412 |
| 2003/0142685 A1* | 7/2003 | Bare | ........................ | H04L 69/22 370/410 |
| 2007/0277074 A1* | 11/2007 | Yeo | ........................ | H04L 1/1614 714/749 |
| 2010/0232427 A1* | 9/2010 | Matsushita | ............. | H04L 47/10 370/389 |
| 2010/0322155 A1* | 12/2010 | Meyer | .................... | H04L 1/1628 370/328 |
| 2010/0325507 A1* | 12/2010 | Sung | ..................... | H04L 1/1867 714/749 |

OTHER PUBLICATIONS

IETF RFC 1072, "TCP Extensions for Long-Delay Paths", Oct. 1988, pp. 1-17.*
Information Sciences Institute, University of Southern California, "Transmission Control Protocol", http://tools.ietf.org/html/rfc793, Sep. 1981.

(Continued)

*Primary Examiner* — Scott M Sciacca

(57) ABSTRACT

The present invention provides a better solution to the problem of reporting to the transmitter the data received by a receiver in the field of data communications. This is achieved by reporting the status of the receivers' window. The cumulative sequence number is placed in the first field of the acknowledgement report as per the present invention. As per prior negotiation, the optional field of missing and received span pairs is placed after that. The first missing span length occurs after that. The next received span length is placed after that. Thereafter, the next missing span length and the received span lengths are placed one after the other. The last received data span is acknowledged in the last field. One optional field can occur either before or after this layout to represent the receiver open window status.

16 Claims, 4 Drawing Sheets

(56) References Cited

OTHER PUBLICATIONS

Strayer, et al, XTP Forum, "Xpress Transport Protocol Specification, XTP Revision 4.0", http://www.ir.bbn.com/~strayer/xtp/xtp-4_0-spec.pdf, Mar. 1995.
Floyd, S., "Issues of TCP with SACK", http://www.icir.org/floyd/papers/issues_sa.pdf, Mar. 9, 1996.
Jacobson, V. and R. Braden, "TCP Extensions for Long-Delay Paths", https://tools.ietf.org/html/rfc1072, Oct. 1988.
Mathis, M., Mahdavi, J., Floyd, S. and A. Romanow, "TCP Selective Acknowledgement Options", https://tools.ietf.org/html/rfc2018, Oct. 1996.
Floyd, S., Mathis, M., Mahdavi, J, and M. Podolsky, "An Extension to the Selective Acknowledgement (SACK) Option for TCP", https://tools.ietf.org/html/rfc2883, Jul. 2000.

* cited by examiner

| 302 | 304 | ACK | SACK LAYOUT 308 | | | | | |
|---|---|---|---|---|---|---|---|---|
| DATA RECEIVED / LOST | TRIGGERING SEGMENT | | 1ST BLOCK | | 2ND BLOCK | | 3RD BLOCK | |
| | | | LEFT EDGE | RIGHT EDGE | LEFT EDGE | RIGHT EDGE | LEFT EDGE | RIGHT EDGE |
| 5120 RECEIVED | 5096 | 6120 | | | | | | |
| 1024 LOST | 6120 | | | | | | | |
| 1024 RECEIVED | 7144 | 6120 | 7144 | 8168 | | | | |
| 1024 LOST | 8168 | | | | | | | |
| 1024 RECEIVED | 9192 | 6120 | 9192 | 10216 | 7144 | 8168 | | |
| 1024 LOST | 10216 | | | | | | | |
| 1024 RECEIVED | 11240 | 6120 | 11240 | 12264 | 9192 | 10216 | 7144 | 8168 |
| SPACE OCCUPIED (OCTET) - SACK | SEQ. NO. WISE | 4 | 4 | 4 | 4 | 4 | 4 | 4 |
| | TOTAL | 28 | | | | | | |

(PRIOR ART)
FIG.3A

| 302 | 304 | RLow Seq | PRESENT INVENTION ACKNOWLEDGEMENT LAYOUT 310 | | | | | |
|---|---|---|---|---|---|---|---|---|
| DATA RECEIVED / LOST | TRIGGERING SEGMENT | | 1ST BLOCK | | 2ND BLOCK | | 3RD BLOCK | |
| | | | MSpan Len | RSpan Len | MSpan Len | RSpan Len | MSpan Len | RSpan Len |
| 5120 RECEIVED | 5096 | 6120 | | | | | | |
| 1024 LOST | 6120 | | | | | | | |
| 1024 RECEIVED | 7144 | 6120 | 1024 | 1024 | | | | |
| 1024 LOST | 8168 | | | | | | | |
| 1024 RECEIVED | 9192 | 6120 | 1024 | 1024 | 1024 | 1024 | | |
| 1024 LOST | 10216 | | | | | | | |
| 1024 RECEIVED | 11240 | 6120 | 1024 | 1024 | 1024 | 1024 | 1024 | 1024 |
| SPACE OCCUPIED (OCTET) - PRESENT INVENTION FORMAT | BLOCK / SEQ. NO. WISE | 4 | 2 | 2 | 2 | 2 | 2 | 2 |
| | TOTAL | 16 | | | | | | |

FIG.3B

| 402 | 404 | 406 | 408 | 410 | 412 | 414 | 416 | 418 |
|---|---|---|---|---|---|---|---|---|
| RLowSeq | NSpanPairs (optional) | MSpanLen 1 | RSpanLen 1 | MSpanLen 2 | RSpanLen 2 | MSpanLen N | RSpanLen N | ROpenWin (optional) |

FIG.4A (400)

| 402 | 404 | 406 | 408 | 410 | 412 | 414 | 416 | 418 |
|---|---|---|---|---|---|---|---|---|
| 6120 | 3 | 1024 | 1024 | 1024 | 1024 | 1024 | 1024 | 59392 |

FIG.4B (401)

| 402 | 404 | 406 | 408 | 410 | 418 | 418 | 418 |
|---|---|---|---|---|---|---|---|
| 6120 | 2 | 1024 | 65536 | 0 | 36864 | 27648 | |

FIG.4C (403)

SYSTEM AND METHOD FOR RECEIVER WINDOW STATUS ACKNOWLEDGEMENT IN DATA COMMUNICATION

CROSS-REFERENCE TO RELATED APPLICATIONS

This application claims the benefit of U.S. Provisional Application No. 62/077,193, entitled "Receiver Window Status Acknowledgement in Data Communication" filed Nov. 8, 2014, the contents of which are incorporated herein by reference.

FIELD OF THE INVENTION

The present invention relates to the field of data communication. More particularly, the present invention relates to a system and method for reliable reporting of status of receiver window in the field of data communication.

BACKGROUND OF THE INVENTION

Reliable data transmissions are accomplished by a combination of an acknowledgement (ACK) mechanism and retransmission. If any part of the data is not received, the transmitter needs to be made aware of it. The receiver sends acknowledgements to the transmitter for the data received. The transmitter retransmits the data till it gets an acknowledgement from receiver that it has received it. There are two types of retransmissions in practice. In traditional types, like Transmission Control Protocol (TCP), the transmitter determines data is lost if it does not receive acknowledgement within a configured time period. It pro-actively retransmits the data when this timer expires. In the newer types, like eXpress Transfer Protocol (XTP), the transmitter requests an acknowledgement instead of sending the data. When the acknowledgement packet arrives at the transmitter without the acknowledgement for any piece of data it had sent, the transmitter retransmits the data.

In the world of multicast, typically a negative acknowledgement (NACK) is used, as the number of receivers is very high. In such scenarios, positive acknowledgements would create an even bigger load of acknowledgement handling. The problem is mitigated in some protocols by using a hierarchy of receivers that collect, collate and transmit the acknowledgements.

There is a round trip delay from the time a data is transmitted and the corresponding acknowledgement is received. To better utilize the data channel, a transmission window is utilized. This is the amount of data the transmitter can transmit without waiting for an acknowledgement. This speeds up the data transfer. Problem happens when some segments from this window are lost in transit. In protocols like TCP, the transmitter retransmits everything from the first point of loss. This results in repeated transmission even for the data already received. This improved with the implementation of selective acknowledgement (SACK) as defined by RFC2018 and RFC2883 became more prevalent. RFC1072 defined the first version of SACK for TCP that was never implemented. Protocols like XTP have selective acknowledgement implemented from the beginning. With selective acknowledgement implementations, the transmitter retransmits only those portions that are not acknowledged. In all the current acknowledgement mechanisms, actual sequence numbers are used in reporting received spans. For a received data segment, the starting sequence number and the ending sequence number of the span are reported.

With the prevalent mechanism of selective acknowledgement, there are transmission problems and inefficiencies:

1. Transmission Window behavior not specified: RFC2018 does not adequately specify the transmission window behavior in conjunction with SACK. Some of the implementations allow the server to keep on sending window size minus the amount of data lost, updating it with all the SACKs received. The receiver process needs to hold on to all the data till the hole is repaired. This causes out of buffer situations at the receiver.
2. Data reneging at the receiver: RFC2018 allows for receivers to drop data, without informing, even if they are acknowledged in the SACK. This causes misunderstandings between the transmitter and receiver about what data the receiver actually has or does not have.
3. Effect of sack is meant to be cumulative. That means, each sack data needs to be evaluated in conjunction with prior received sack packets. If any sack packet is lost, the transmitter will end up misinterpreting the results.
4. RFC1072 introduced a concept of window scaling where they could address windows larger than 64K (64 times 1024) bytes window with span length field of two octets by introducing a scale factor. The problem with the scale factor was that there was loss of accuracy from the scaled number to the actual number. This required interpretation at the transmitter's end and also occasional duplicate transmission of data spans. This was overridden by RFC2018 specification.
5. All existing selective acknowledgements use the actual sequence number to indicate the data received. This is less than efficient as they consume more space in the control protocol or header. Protocols like TCP, that use header to transmit the acknowledgements, get limited by the number of spans they can report.

Accordingly, there exists in the art a need for a system and method for reliable reporting of receiver window status.

OBJECTS OF THE INVENTION

An object of the present invention is to provide a system and method for reporting complete status of a receiver window in an acknowledgement report in a data communication system.

Another object of the present invention is to provide a system and method for reporting higher number of received or missing spans in an acknowledgement report in a data communication system compared to prior art acknowledgement protocols.

Yet another object of the present invention is to provide a system and method for having better control over buffer usage in transmitter and receiver in a data communication system.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention provides a better solution to the problem of reporting to the transmitter the data received by a receiver in the field of data communications. This is achieved by reporting the status of the receivers' window.

The cumulative sequence number is placed in the first field of the acknowledgement report as per the present invention. As per prior negotiation, the optional field of missing and received span pairs is placed after that. The first missing span length occurs after that. The next received span length is placed after that. Thereafter, the next missing span length and the received span lengths are placed one after the other. The last received data span is acknowledged in the last field. One optional field can occur either before or after this layout to represent the receiver open window status.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope for all embodiments, various embodiments will be described and explained with additional specificity and detail through the use of the accompanying drawings in which:

FIG. 3A illustrates an exemplary table showing a conventional selective acknowledgement layout format;

FIG. 3B illustrates an exemplary table showing an acknowledgement format in accordance with an embodiment of the present invention;

FIG. 4A illustrates an exemplary acknowledgement layout format in accordance with an embodiment of the present invention;

FIG. 4B illustrates an acknowledgement layout format for an example in accordance with an embodiment of the present invention;

FIG. 4C illustrates an acknowledgement layout format for another example in accordance with an embodiment of the present invention.

DETAILED DESCRIPTION OF THE INVENTION

Figure 1:
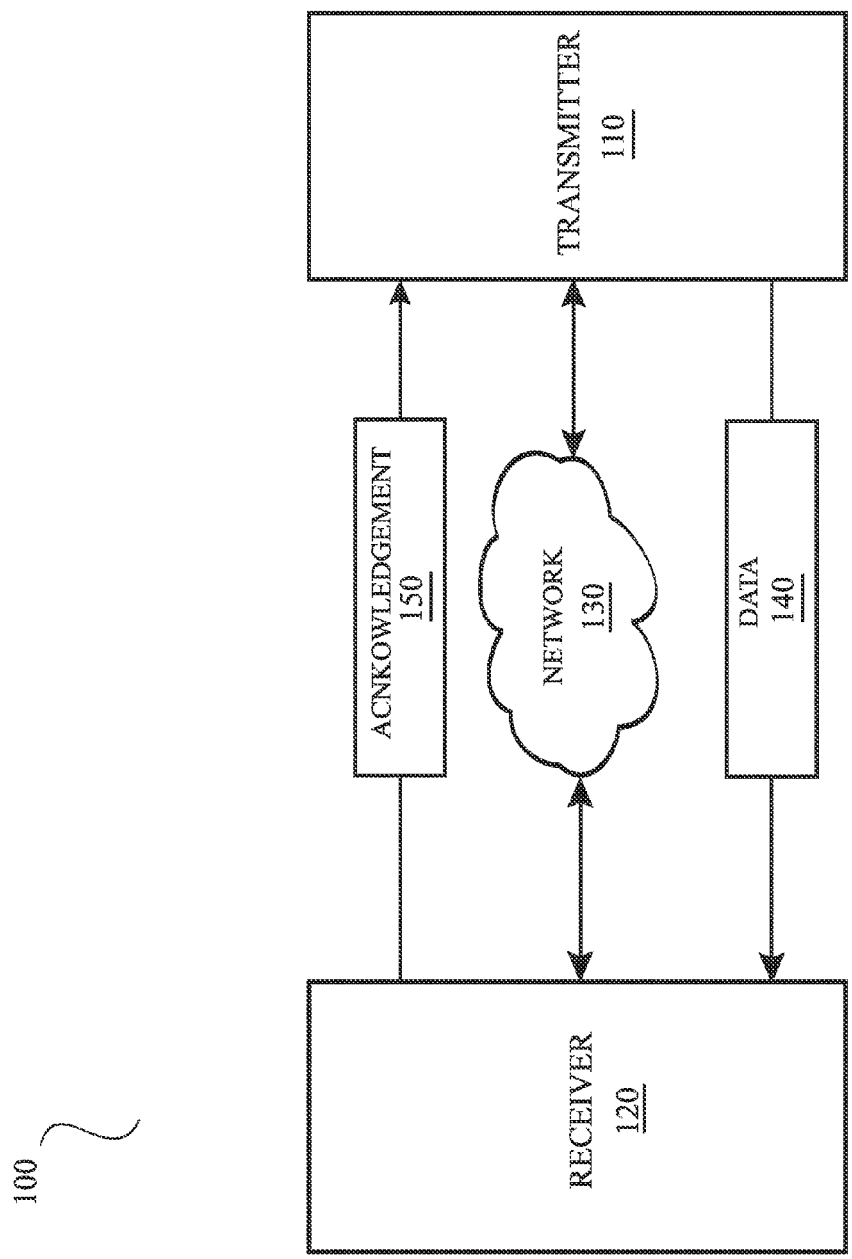
FIG. 1 shows a general architecture of a data transmission system.

FIG. 1 shows an exemplary system for data communication 100. The data communication system 100 includes at least one computing device acting as a receiver 120 and at least one computing device acting as a server or transmitter 110. In other embodiments, the computing device 110 can assume the role of a receiver and the computing device 120 can assume the role of a transmitter. The transmitter 110 and receiver 120 are communicatively connected with each other over a network 130.

As used herein, the term "network" generally refers to any collection of distinct networks working together to appear as a single network such to a user. The term refers to the so-called world wide "network of networks" that is connected to each other using the Internet Protocol (IP) and other similar protocols. As described herein, the exemplary public network 130 of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1.

The transmitter 110 is configured to transmit flow of bytes or data packets 140 over the network 130. Each of such data bytes or packets 140 has a sequence number. Each packet has a sequence number field. The transmitter 110 utilizes sequence numbering with transmission of each data packet 140. For example, the transmitter 110 may insert sequence numbering into the data packet as the data packets are generated or transmitted, The receiver 120 uses the sequence numbers to determine lost or corrupt data packets 140 or to reorder the received data packets prior to sending to upper layers.

Upon reception of a data packet 140, the receiver 120 generates and transmits an acknowledgement 150. The receiver 120 can implement a Selective Acknowledgement (SACK) according to the recommendation of RFC 2018, The SACK packet includes a number of fields, each of which can hold a range of sequence numbers to indicate a set of received data packets. The TCP header has room for up to four SACK ranges. The first SACK range includes the landing packet that triggered this SACK packet, and any additional ranges, up to the capacity of the SACK packet, are to be presented in most recent temporal order.

Figure 2:
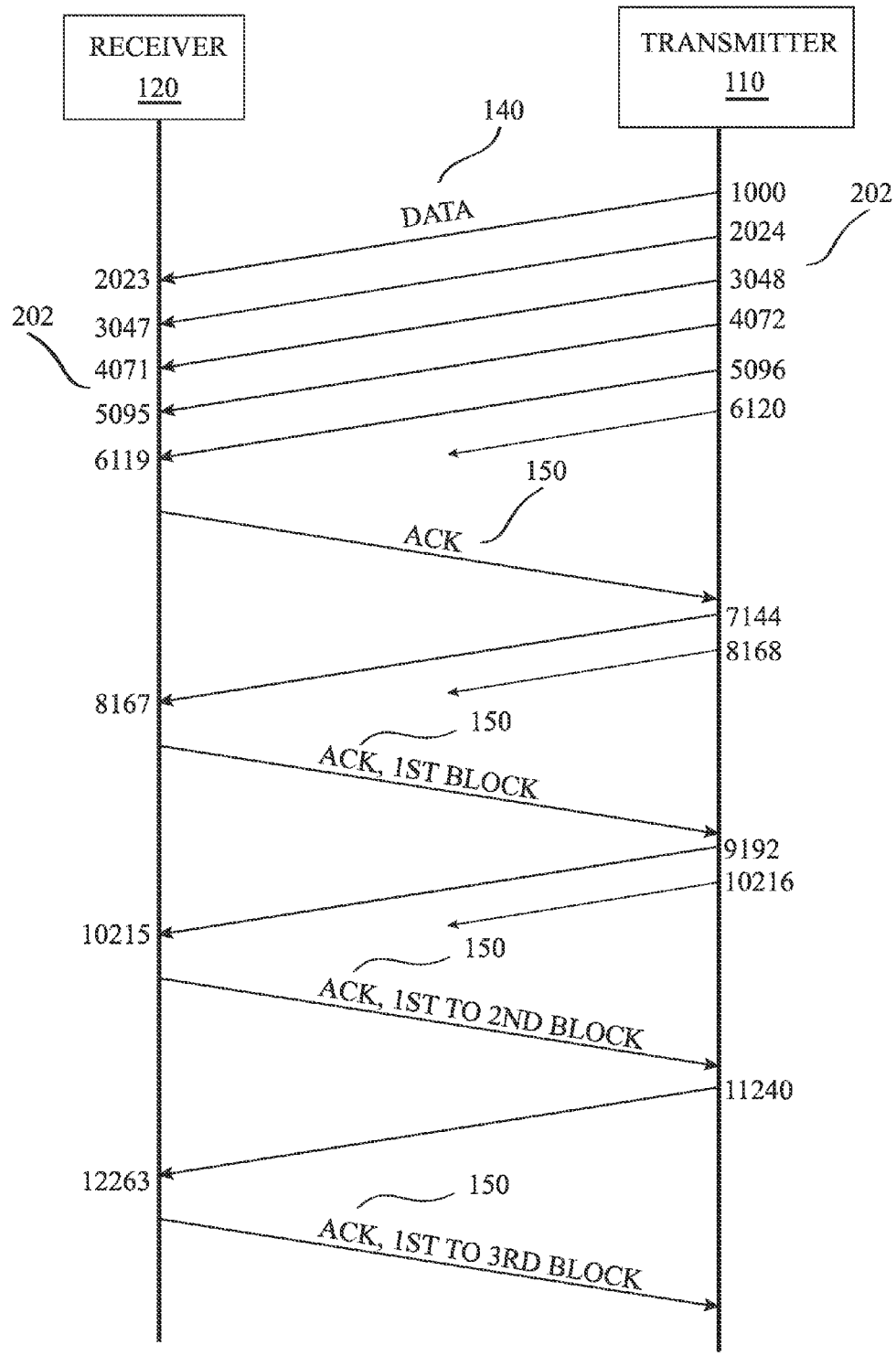
FIG. 2 illustrates a data transmission and acknowledgement exchange between the transmitter and receiver in the system of FIG. 1.

FIG. 2 and FIG. 3A illustrate a data transmission scenario with respect to SACK and FIG. 3B illustrates the acknowledgement format proposed by the present invention. In the exemplary scenario the transmission window is 64K and the transmitter 110 is transmitting data packets or data segments 140 in sizes of 1K (1024 bytes) starting with a sequence number 1000 (sequence numbers are referred to as 202 in FIG. 2). The receiver 120 has received all the data up to the sequence number 6120. After that, the receiver 120 receives every alternate data packets 140 till the last data packet with ending sequence number 12264. The SACK format, for this example, as per RFC 2018, is shown under columns 308 of the table shown in FIG. 3A. Column 302 of the tables shown in FIG. 3A and FIG. 3B show size of the data 140 which has been transmitted or lost between the transmitter 110 and receiver 120 and column 304 shows the sequence number of the triggering data segments. Each of the SACK blocks shown under column 308 uses sequence numbers of the left edge and right edge of the blocks to represent a noncontiguous block of a contiguous data. Since, one 32 bit unsigned integer or 4 octets are required to represent a sequence number, each SACK block needs 8 octets. Thus, in the present example, for the three SACK blocks, 24 octets are required. As shown in row 314 of the table in FIG. 3A, with 4 octets needed to represent the left edge of the receiver window, the total octets required by the SACK blocks is 28.

Reference to FIG. 4A the format of the acknowledgment report 400, generated by the receiver 120 in response to the one or more received and missing data spans 140 detected by the receiver 120, as proposed by the present invention, hinges on the fact that if the entire state of the receiver window is described with every acknowledgement, there is no ambiguity. In the acknowledgment report 400, the cumulative sequence number i.e. the point up to which all data has been received successfully by the receiver 120, occupies the first field of the report. The received or missing segments are defined as span lengths after this cumulative sequence number. So, the number of bits used to describe the received sequence numbers and the missing sequence numbers can be less than what is needed to specify the actual sequence numbers. To indicate the various fields of the acknowledgment report 400, certain definitions and abbreviations or acronyms, as mentioned below, can be used.

RLowSeq: The Receiver's Lowest cumulative Sequence number up to which all data has been received and acknowledgement sent to the transmitter. It is the lower bound of the receiver's window.

Span: A contiguous segment of data received or missing at the receiver is called a span. The length can be of zero value.

NSpanPairs: Number of Span Pairs of a missing span and a received span being sent in the acknowledgement data.

MSpanLen: Missing Span Length is the length of a contiguous data segment not received by the receiver RSpanLen: Received Span Length is the length of data received by the receiver.

ROpenWin: Receiver's Open Window is the amount of data the receiver can accept in the temporary buffers before they are sent to the user process. It usually would be the transmission window minus the sum of all the missing and received spans.

FIG. 4A is an illustration of how the fields can be laid out in an acknowledgement report for the data received in accordance with the present invention. The first mandatory field of the acknowledgement report 400 is the RLowSeq 402 that reports the last sequence number up to which the data 140 has been received without any gap. If the protocol does not have a way of determining the number of span lengths being reported, the count is specified in the field NSpanPairs 404. The first MSpanLen1 406, which follows the NSpanPairs 404, reports the length of the first missing span of data. Following that is RSpanLen1 408, the length of the next span of data received by the receiver 120. Similarly, the next missing span and received spans are reported by MSpanLen2 412 and RSpanLen2 414 respectively. This is done till the last span of data received is being reported by RSpanLenN 416 which follows the last missing span MSpanLenN 414. The acknowledgement report 400 can optionally include a field ROpenWin 418 to report the additional length of data 140 the receiver 120 can accommodate in its temporary buffers. The implementation specific decision to send any of the optional fields in any position is either a part of the specification, configuration or negotiation of the data communication system 100.

The acknowledgement format, in accordance with an embodiment of the present invention, for the above mentioned example, will look like the format 401 shown in FIG. 4B. The first of the format 401 is filled with sequence number 6120 which is RLowSeq i.e. the last sequence number till which data has been all received by the receiver 120. Being a sequence number it occupies 4 octets. As can be seen under columns 310 in FIG. 3B, there will be 3 pairs of MSpanLen and RSpanLen in this example. Thus, the acknowledgement format 401 can optionally include 3 as the number of span lengths reported NSpanPairs. In the present example, the transmitter 110 was sending data packets in sizes of 1024 octets, so each MSpanLen and RSpanLen is represented by the span length of 1024 in the acknowledgement format 401 starting with the first missing span in field 406 after the optional field of NSpanPairs 404. As shown in column 312 of FIG. 3B, each field of the acknowledgement format 401, for MSpanLen and RSpanLen, occupies a space of 2 octets. Thus, the total space occupied by the essential fields of the acknowledgement format 401 is 16 octets as against 28 octets occupied by SACK format. The format 401 can further include optional field of ROpenWin 418 which is 59392 octets (64K−6K=58K=59392).

The size of the field needed to describe each received or missing span length can be equal or less than the field size of the window and the present invention makes use of this fact. As shown in the above example, in the case a window of 64K (64×1024) octets, the span lengths can be described using two octets. Also in the case of window length of 128K, a field length of two octets can still be used to describe the span lengths. If there is a missing or received span greater than the span length size, it can be broken into multiple spans with length fields of zero inserted between them. So, for a window length of 128K, if there is a missing or received length of 100K, it can be broken into two lengths of 64K and 36K with a 0 length in between. For example, in a certain data transmission scenario in data communication system 100, the transmission window is 128K octets. The transmitter 110 is sending in sizes of 1K (1024) starting with a sequence number of 1000. The receiver 120 has received all data up to 6120. After that it is missing 1K data. After that it has received 100K of data. FIG. 4C shows the acknowledgement report 403 in accordance with an embodiment of the present invention. In the acknowledgement report 403

RLowSeq=6120
NSpanPairs=2
MSpanLen 1=1024
RspanLen 1=65536
MSpanLen 2=0
RSpanLen 2=36864
ROpenWin=128K−1K−100K=27K=27648

In the above example, the 100K received span is broken into a 64K span and a 36K span with a 0 length missing span in between.

If the space provided for reporting the above described receiver window status is inadequate, the receiver can report only the initial portion of the window as much as allowed by the space provided. For example, in case of TCP, the header space that carries this information is limited; so only four spans can be reported. When some of the gaps are addressed, the receiver can report additional portion of its window.

The sequence number can wrap around after reaching its field maximum value. So, the comparison of sequence number should always be wrap adjusted.

Sometimes, the transmitter can get a second acknowledgement packet from the receiver before it has acted upon the first. Sometimes, it can receive the older acknowledgement after it has received and acted upon a newer acknowledgement. It should act upon the latest received packet only if it is newer. The acknowledgement that is newer is determined by the following conditions:

1. The RLowSeq is higher after wrap adjustment.
2. If the RLowSeq is the same, the upper edge of the window after adding up the span lengths is higher
3. If the results of the above two are inconclusive, the number of spans reported is less.

For TCP, comparing with RFC2018, the mechanism of the present invention increases the number of spans to be reported. TCP has 40 bytes available for options. With RFC2018, we have 8*n+2<=40, where n is the number of received spans reported. This results in a maximum value of 4 spans. With this present invention, given the usual value of 64KB window size and 2 octets for span length, we need 4 octets for each received span. This allows 10 spans to be reported if the optional NSpanPairs is not used and 9 spans if NSpanPairs is used. For window size beyond 64K, the number will drop by 1 for each span bigger than 64K octets.

If precision is not an issue, this mechanism can also be coupled with scaling option as defined by RFC 1072 allowing even higher number of spans to be reported.

Since the lengths are all initial offsets from the cumulative sequence number, RLowSeq, the design does not allow run away transmissions and hence better control over buffer usage.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Additionally, other variations are within the spirit of the present invention. Thus, while the invention is susceptible to various modifications and alternative representations, a certain illustrated embodiment thereof is shown in the drawings and has been described above in detail. It should be understood, however, that there is no intention to limit the invention to the specific form or forms disclosed, but on the contrary, the intention is to cover all modifications, alternative representations, and equivalents falling within the spirit and scope of the invention, as defined in the appended claims.

What is claimed is:

1. A method for acknowledging window status of a receiver in a data communication system, said data communication system including a transmitter communicatively connected to said receiver over a network, said method comprising:
    placing a cumulative sequence number of all data packets that have been successfully received by said receiver without any gap among a plurality of data packets sent from said transmitter in a first field of a plurality of fields of an acknowledgement report generated by said receiver;
    placing a span length of each of one or more missing data packets and each of one or more received data packets of said plurality of data packets by said receiver in said plurality of fields of said acknowledgement report after placing said cumulative sequence number;
    breaking said span length into a multiple span lengths if said span length exceeds a span length field size; and
    inserting a value of zero between two of said multiple span lengths for said placing in said plurality of fields of said acknowledgement report.

2. The method for acknowledging window status of a receiver in a data communication system as claimed in claim 1, wherein said acknowledgement report specifies a whole of said window of said receiver.

3. The method for acknowledging window status of a receiver in a data communication system as claimed in claim 1, wherein a first of said span length of said one or more missing data packets is placed in a field of said plurality of fields of said acknowledgement report just after said cumulative sequence number.

4. The method for acknowledging window status of a receiver in a data communication system as claimed in claim 1, wherein said placing of said span length of each of said one or more missing data packets is followed by said placing of said span length of each of said one or more received data packets of said plurality of data packets by said receiver in said plurality of fields of said acknowledgement report.

5. The method for acknowledging window status of a receiver in a data communication system as claimed in claim 4, wherein said placing of said span length of each of said one or more missing data packets followed by said placing of said span length of each of said one or more received data packets in said plurality of fields of said acknowledgement report is continued until last of said one or more received data packets is reported.

6. The method for acknowledging window status of a receiver in a data communication system as claimed in claim 1, wherein a total number of pairs of consecutive missing data packets and received data packets of said plurality of data packets reported in said acknowledgement report is included in one of the fields of said plurality of fields of said acknowledgement report.

7. The method for acknowledging window status of a receiver in a data communication system as claimed in claim 1, wherein an amount of data said receiver can accept is reported in one of said fields of said plurality of fields of said acknowledgement report.

8. The method for acknowledging window status of a receiver in a data communication system as claimed in claim 1, wherein said acknowledgment report is scalable when coupled with a scale factor defined by RFC1072.

9. The method for acknowledging window status of a receiver in a data communication system as claimed in claim 1, wherein said acknowledgment report is new for said transmitter to act upon:
    if said cumulative sequence number of said acknowledgement report is higher after a wrap adjustment than that of any other acknowledgement report received by said transmitter; or
    if said cumulative sequence number is same as that of said any other acknowledgement report and an upper edge of said window after adding up said span lengths is higher than that of said any other acknowledgement report received by said transmitter; or
    if said span lengths reported is less than that of said any other acknowledgement report received by said transmitter.

10. A system comprising:
    a transmitter connectable to a network; and
    a receiver connectable to said transmitter over said network;
        said receiver configured to generate an acknowledgement report responsive to receiving a plurality of data packets from said transmitter, wherein
        a cumulative sequence number of all data packets that have been successfully received by said receiver without any gap among said plurality of data packets is placed in a first field of a plurality of fields of said acknowledgement report, a span length of each of one or more missing data packets and each of one or more received data packets of said plurality of data packets is placed in said plurality of fields of said acknowledgement report after placing said cumulative sequence number, and each of said span length of said one or more missing data packets or of said one or more received data packets is broken into a multiple span lengths and a value of zero is inserted between two of said multiple span lengths for said placing in said plurality of fields of acknowledgement report if said span length exceeds a span length field size.

11. The system as claimed in claim 10, wherein said acknowledgement report specifies a whole of said window of said receiver.

12. The system as claimed in claim 10, wherein a first of said span length of said one or more missing data packets is placed in a field of said plurality of fields of said acknowledgement report just after said cumulative sequence number.

13. The system as claimed in claim 10, wherein said span length of each of said one or more missing data packets is followed by said span length of each of said one or more received data packets of said plurality of data packets by said receiver in said plurality of fields of said acknowledgement report.

14. The system as claimed in claim 13, wherein said span length of each of said one or more missing data packets followed by said span length of each of said one or more received data packets in said plurality of fields of said acknowledgement report is continued until last of said one or more received data packets is reported.

15. The system as claimed in claim 10, wherein a total number of pairs of consecutive missing data packet and received data packet of said plurality of data packets reported in said acknowledgement report is included in one of the fields of said plurality of fields of said acknowledgement report.

16. The system as claimed in claim 10, wherein an amount of data said receiver can accept is reported in one of said fields of said plurality of fields of said acknowledgement report.

* * * * *